(12) United States Patent  (10) Patent No.: US 11,614,906 B2
Kobayashi et al.  (45) Date of Patent:  Mar. 28, 2023

(54) INFORMATION PROCESSING APPARATUS, CONTROL METHOD OF INFORMATION PROCESSING APPARATUS, AND PROGRAM

(71) Applicant: CANON KABUSHIKI KAISHA, Tokyo (JP)

(72) Inventors: Tetsuharu Kobayashi, Ibaraki (JP); Tatsuro Uchida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/500,536

(22) Filed: Oct. 13, 2021

(65) Prior Publication Data

US 2022/0121406 A1  Apr. 21, 2022

(30) Foreign Application Priority Data

Oct. 20, 2020  (JP) .............................. JP2020-175788

(51) Int. Cl.
*G06F 3/12* (2006.01)
*G06K 15/02* (2006.01)

(52) U.S. Cl.
CPC .......... *G06F 3/1239* (2013.01); *G06F 3/1204* (2013.01); *G06F 3/1205* (2013.01); *G06F 3/1222* (2013.01); *G06K 15/1809* (2013.01)

(58) Field of Classification Search
CPC combination set(s) only.
See application file for complete search history.

(56) References Cited

U.S. PATENT DOCUMENTS

| 2009/0147306 | A1* | 6/2009 | Sugiyama | G06F 3/1238 358/1.15 |
| 2009/0284387 | A1* | 11/2009 | Marchetti | G06K 15/005 340/815.45 |
| 2011/0286022 | A1* | 11/2011 | Kakitsuba | G06F 3/1288 358/1.13 |
| 2013/0286426 | A1* | 10/2013 | Morovic | G06F 3/1288 358/1.14 |
| 2015/0277824 | A1* | 10/2015 | Hiruma | G06F 3/1222 358/1.14 |
| 2018/0152599 | A1* | 5/2018 | Fukuda | H04N 1/32122 |
| 2018/0260181 | A1* | 9/2018 | Shiohara | G06F 3/1296 |
| 2019/0095141 | A1* | 3/2019 | Yoshihara | G06F 3/1257 |
| 2019/0235811 | A1* | 8/2019 | Kobayashi | G06F 3/1239 |
| 2019/0258440 | A1* | 8/2019 | Kawaura | G06F 3/1224 |

(Continued)

FOREIGN PATENT DOCUMENTS

JP          2013054778 A          3/2013

*Primary Examiner* — Helen Zong
(74) *Attorney, Agent, or Firm* — Canon U.S.A., Inc. IP Division

(57) ABSTRACT

An information processing apparatus connected to a printing apparatus includes a storage configured to store user print settings, common print settings, and restrictive information restricting changes to print settings; a display configured to display print settings; and a controller including a processor and configured to acquire the user print settings, the restrictive information, and the common print settings. If there is a setting item restricted by the restrictive information, the controller causes a setting value in the common print settings to be reflected in a setting value for the restricted setting item of the user print settings, and causes the display to display the resulting user print settings, with entry for the restricted setting item being restricted.

12 Claims, 14 Drawing Sheets

(56) References Cited

U.S. PATENT DOCUMENTS

| | | | |
|---|---|---|---|
| 2019/0265918 A1* | 8/2019 | Kobayashi | G06F 3/1239 |
| 2019/0332339 A1* | 10/2019 | Nakai | G06F 21/31 |
| 2019/0361634 A1* | 11/2019 | Inoue | G06F 3/1288 |
| 2020/0382665 A1* | 12/2020 | Awata | H04N 1/00514 |
| 2021/0243329 A1* | 8/2021 | Sohma | H04N 1/32021 |

* cited by examiner

FIG. 6

| | | |
|---|---|---|
| Print Settings | | ✕ |

Favorites: 📄 Default Settings ▼  [Add] [Edit]  ~1401

Original Size: [A4 ▼]  ~1402

Output Paper Size: [Same as Original Size ▼]  ~1403

Number of Copies: [1] Copies  ~1404

Page Layout: [1 on 1 ▼]  ~1405

☐ Manual Scaling    Scaling: [100] % (25-200)  ~1406

Color Mode: [Auto (Color/Black and White) ▼]  ~1407

☐ Stamp    [Edit Stamp]  ~1408

☐ Function Lock    [Lock Settings]  ~1409

[OK]  [Cancel]  [Apply]
1410   1411    1412

1400

| LOCK SETTINGS | PRINT SETTING ITEMS |
|---|---|
| COPIES LOCK | NUMBER OF COPIES |
| LAYOUT LOCK | OUTPUT PAPER SIZE, PAGE LAYOUT, SCALING |
| COLOR MODE LOCK | COLOR MODE |
| STAMP LOCK | STAMP |

1700
LOCK FUNCTION SETTINGS

| COPIES LOCK | 0 |
|---|---|
| LAYOUT LOCK | 1 |
| COLOR MODE LOCK | 1 |
| STAMP LOCK | 0 |

# INFORMATION PROCESSING APPARATUS, CONTROL METHOD OF INFORMATION PROCESSING APPARATUS, AND PROGRAM

BACKGROUND

Field of the Disclosure

The present disclosure relates to an information processing apparatus that is capable of changing settings of a printing apparatus to which the information processing apparatus is connected by a network.

Description of the Related Art

For printing on a printing apparatus (or printer) from an information processing apparatus, such as a personal computer, software called a printer driver is generally used. For printing from any application, the printer driver operates to provide a unique user interface that allows the user to specify various print settings.

For example, administrators often want to restrict general users from using some print settings. With a printer driver having a lock function for locking print settings, the administrators have restricted the use of settings available to general users.

Japanese Patent Laid-Open No. 2013-54778 describes a lock function by which desired print settings are fixed as specified. The lock function can be set for each of print settings, such as print layout and color mode (color or black and white). By locking a print setting, a setting value for the corresponding setting item is locked at a setting value currently set.

Before an administrator locks a print setting of the printer driver, a general user might have changed the corresponding default print setting and used the printer. In this case, if the administrator locks the print setting using the lock function of the printer driver, the print setting is locked at the print setting the general user has changed.

SUMMARY

Embodiments of the present disclosure provide an information processing apparatus connected to a printing apparatus and including a storage, a display, and a controller. The storage is configured to store user print settings, common print settings, and restrictive information restricting changes to print settings; the display is configured to display print settings; and the controller includes a processor and is configured to acquire the user print settings, the restrictive information, and the common print settings. If there is a setting item restricted by the restrictive information, the controller causes a setting value in the common print settings to be reflected in a setting value for the restricted setting item of the user print settings, and causes the display to display the resulting user print settings, with entry for the restricted setting item being restricted.

Further features of the present disclosure will become apparent from the following description of exemplary embodiments with reference to the attached drawings.

BRIEF DESCRIPTION OF THE DRAWINGS

FIG. 6 illustrates a print settings user interface (UI) of a printer driver according to the first embodiment.

DESCRIPTION OF THE EMBODIMENTS

Figure 1:
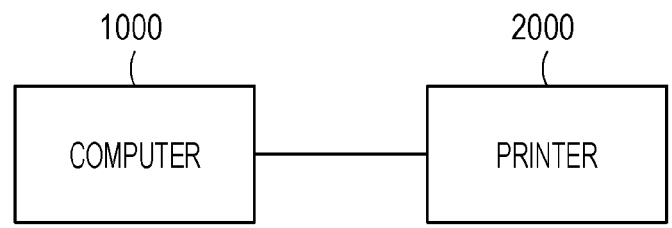
FIG. 1 illustrates a general configuration of a printing system according to a first embodiment.

Embodiments for implementing the present disclosure will now be described with reference to the drawing.

First Embodiment (1) Configuration of Printing System
General Configuration of Printing System FIG. 1 illustrates a general configuration of a printing system according to a first embodiment. In the printing system illustrated in FIG. 1, a computer 1000 (information processing apparatus) and a printer 2000 (printing apparatus) are connected to each other by a universal serial bus (USB) or a network, such as a local area network (LAN). The computer 1000 and the printer 2000 are capable of communicating with each other.

Hardware Configuration of Computer

Figure 2:
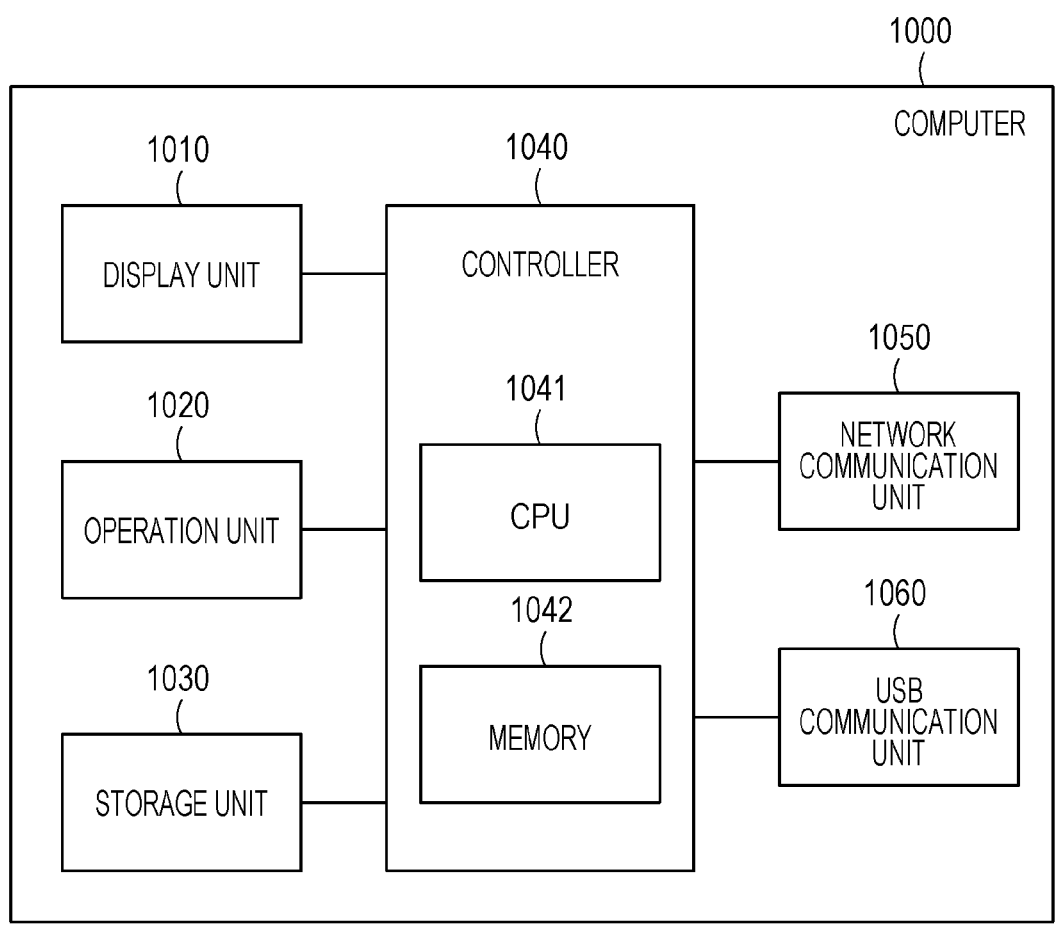
FIG. 2 illustrates a hardware configuration of a computer according to the first embodiment.

FIG. 2 is a block diagram illustrating a hardware configuration of the computer 1000 serving as an information processing apparatus.

A controller 1040 including a central processing unit (CPU) 1041 and a memory 1042 controls an overall operation of the computer 1000. A display unit 1010 is an output device, such as a display, and an operation unit 1020 is an input device, such as a mouse and keyboard or a touch panel. A storage unit 1030 is a storage medium, such as a hard disk or a solid-state drive (SSD), and stores various software programs required for the computer 1000 to operate. The software programs are loaded, as required, into the memory 1042 and executed by the CPU 1041. A network communication unit 1050 is connected to the network and receives input from and outputs data to external devices. A USB communication unit 1060 receives input from and outputs data to external devices through USB connection. Software processing in the present embodiment is all performed when software stored in the storage unit 1030 is loaded into the memory 1042 of the controller 1040 and executed by the CPU 1041.

Hardware Configuration of Printer

Figure 3:
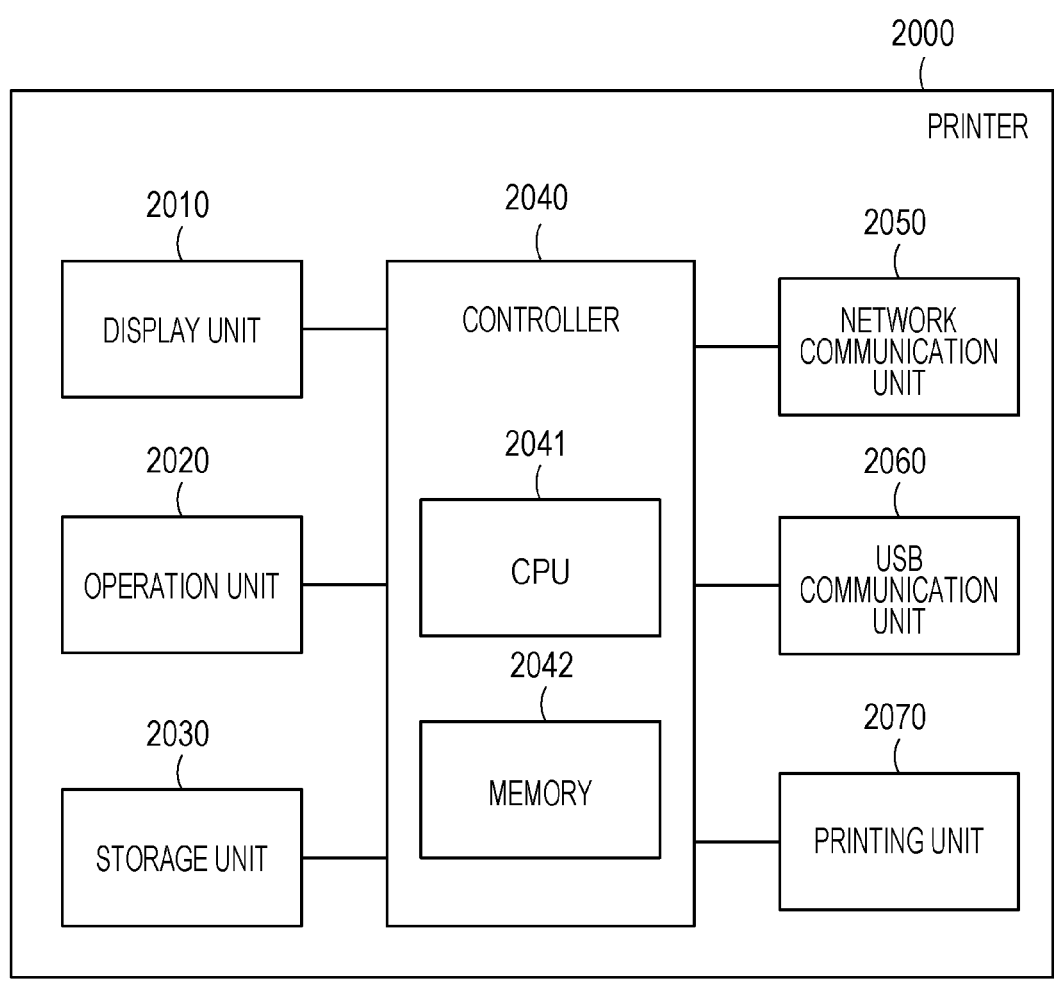
FIG. 3 illustrates a hardware configuration of a printer according to the first embodiment.

FIG. 3 is a block diagram illustrating a hardware configuration of the printer 2000 serving as a printing apparatus.

A controller 2040 including a CPU 2041 and a memory 2042 controls an overall operation of the printer 2000. A display unit 2010 is an output device, such as a liquid-crystal panel, and an operation unit 2020 is an input device, such as a touch panel or a set of various buttons. A storage unit 2030 is a storage medium, such as a hard disk or an SSD, and stores various software programs required for the printer 2000 to operate. The software programs are loaded, as required, into the memory 2042 and executed by the CPU 2041. A network communication unit 2050 is connected to the network and receives input from and outputs data to external devices. The USB communication unit 2060 receives input from and outputs data to external devices through USB connection. In accordance with instructions from the controller 2040, a printing unit 2070 prints, on physical paper, digital data stored in the storage unit 2030 or memory 2042. Ink printing, toner printing, or various other printing techniques can be used.

Software Configuration of Computer

Figure 4:
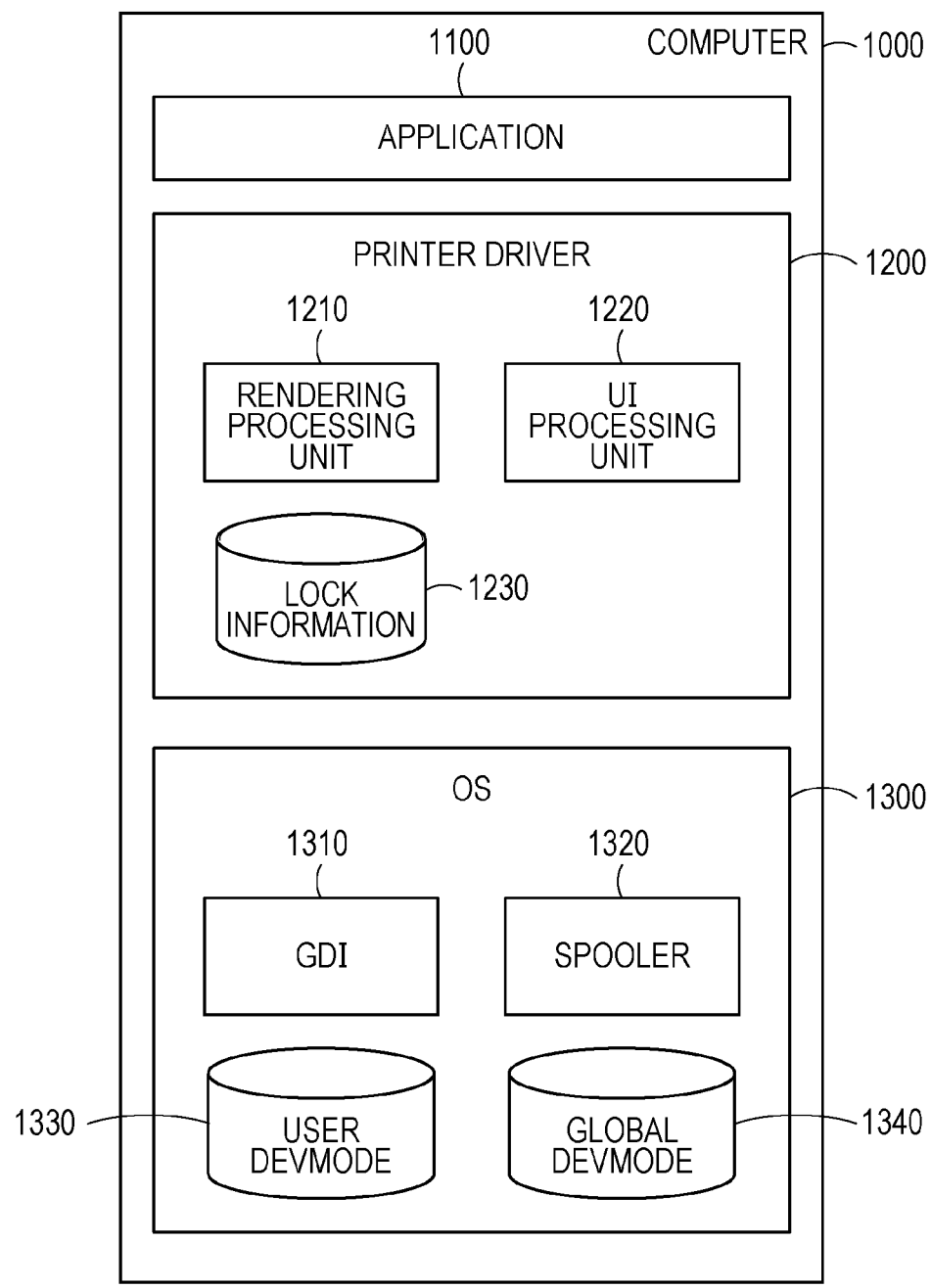
FIG. 4 illustrates a software configuration related to print processing in the computer according to the first embodiment.

FIG. 4 is a block diagram illustrating a software configuration related to print processing in the computer 1000 according to the first embodiment.

An application 1100 is any software, such as word processing software or spreadsheet software, and has a printing function. By performing the printing function prepared by the application 1100, the user can print, on the printer 2000, information currently displayed in the display unit 1010 of the computer 1000.

A printer driver 1200 provides a user interface (UI) to display print settings that can be implemented by the printer 2000. For printing, the printer driver 1200 generates rending data (page description language or PDL) that can be interpreted by the printer 2000.

A UI processing unit 1220 displays and changes print settings. A rendering processing unit 1210 generates a PDL.

The printer driver 1200 has a lock function that restricts changes to setting values for print setting items specified by an administrator user. The printer driver 1200 manages information related to the lock function as restrictive information (hereinafter referred to as "lock information") 1230.

An operating system (OS) 1300 is software that controls basic operations of the computer 1000. The application 1100 and the printer driver 1200 are both managed by the OS 1300 and can be used by being installed onto the OS 1300.

A graphics device interface (GDI) 1310 is an internal component of the OS 1300. The GDI 1310 provides, to the outside, an interface related to a rendering operation, such as a display or printing operation.

A spooler 1320 performs processing for transmitting print data to the printer 2000. When the printer driver 1200 is installed, the OS 1300 creates an object called a printer queue. The OS 1300 manages the printer queue by associating the printer driver 1200 with the printer 2000.

The OS 1300 manages a plurality of users using the computer 1000. The OS 1300 manages print settings using a DEVMODE structure. In Windows, a variable of print settings is called DEVMODE, which will hereinafter be used for simplicity. As default print settings for each user, the OS 1300 manages a plurality of pieces of user DEVMODE 1330 for each printer queue. The user DEVMODE 1330 is used as an initial value of print settings used in the application 1100.

As default print settings common to all users, the OS 1300 manages one global DEVMODE 1340 for each printer queue. The global DEVMODE 1340 is also used as an initial value of print settings the user uses for the first time.

(Storage Area and User Authority)

The data storage area and user authority illustrated in FIG. 4 will now be described. The OS 1300 creates a printer object called a printer queue to manage a plurality of users who use the computer 1000. The OS 1300 prepares two types of user authority, "administrator user" authority for managing settings common to all users of the printer object, and the other "general user" authority.

The administrator user has the authority to write data to an all-users common area in which, for a target printer object, settings used in common by all users are stored. The settings are, for example, print setting values (global DEVMODE) initially applied to all users.

On the other hand, the general user has the authority to read data in the all-users common area.

The administrator user and the general user both have a user dedicated area to and from which data can be freely written and read. For a target printer object, default print settings (user DEVMODE) for each user are stored in the user dedicated area. The administrator user operates data on the computer 1000 either directly or through the network.

(2) Print Processing

Flow of Print Processing

Figure 5:
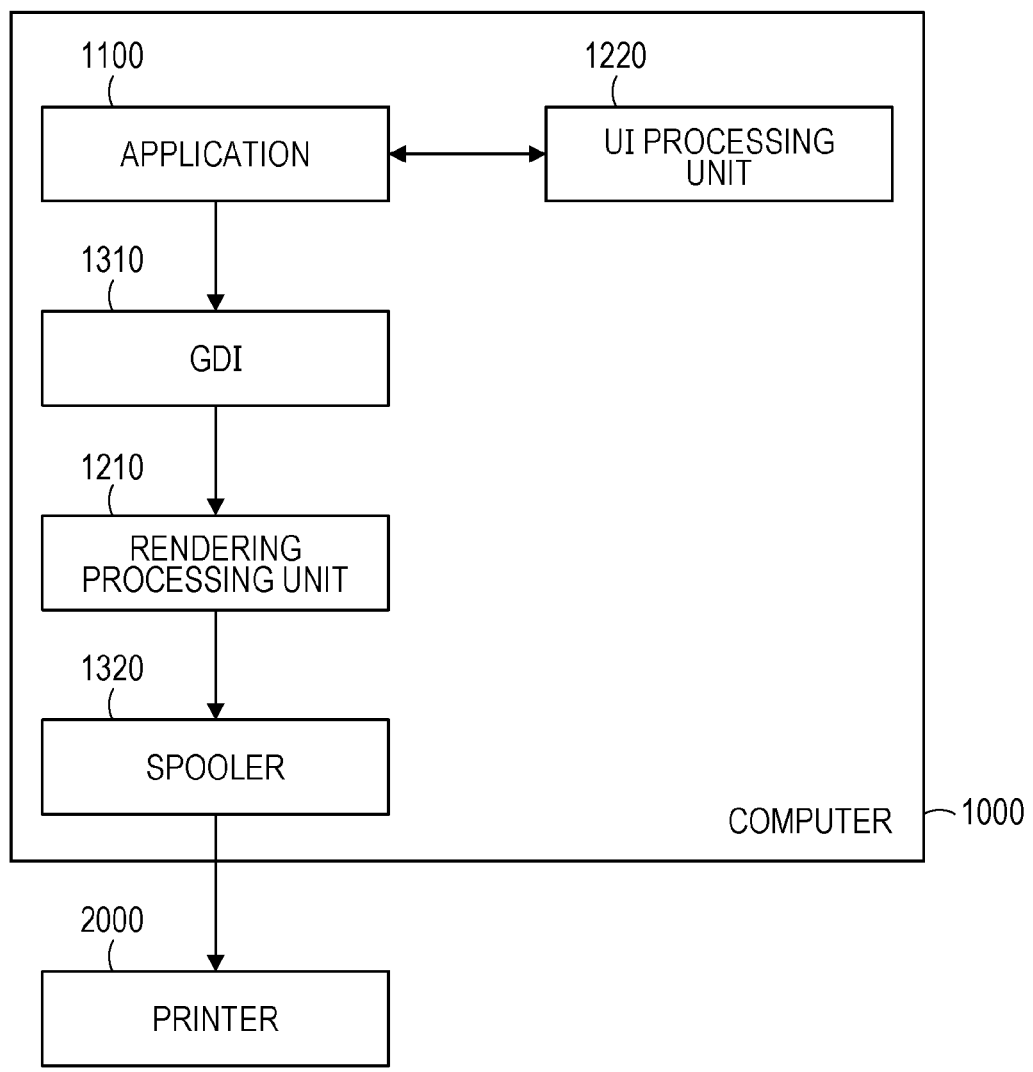
FIG. 5 is a conceptual diagram illustrating a flow of print processing according to the first embodiment.

A general flow of print processing will now be described with reference to FIG. 5.

Before performing the print processing, the application 1100 calls the UI processing unit 1220 of the printer driver 1200 to prompt the user to enter print settings. The user can set any print setting by using a user interface (hereinafter referred to as "UI") displayed by the UI processing unit 1220 of the printer driver 1200.

Then, the application 1100 passes a rendering command representing print content to the GDI 1310, together with the print settings acquired from the UI processing unit 1220, so as to call the GDI 1310.

The GDI 1310 converts the acquired print settings and the rendering command to a command that can be interpreted by the printer driver 1200, and calls the rendering processing unit 1210.

The rendering processing unit 1210 of the printer driver 1200 converts the print settings and the rendering command acquired from the GDI 1310 to a PDL that can be interpreted by the printer 2000, and passes the PDL to the spooler 1320.

The spooler 1320 transmits the PDL to the printer 2000.

The printer 2000 converts the acquired PDL to image data and prints it onto actual physical paper using the printing unit 2070.

Print Settings UI

FIG. 6 illustrates an exemplary print settings UI 1400 displayed by the UI processing unit 1220.

The user operates the print settings UI 1400 to set desired print settings. When called from a setting screen of the OS 1300, the print settings UI 1400 is used to specify all default print settings for printing from the application 1100. There are two types of default print settings, a global default print setting (global DEVMODE) used as an initial value for all users, and a user default print setting (user DEVMODE) used as a default value for each user. The two types of default print settings are separately managed by the OS 1300. When called from the application 1100, the print settings UI 1400 is used to specify temporary print settings to be used in the application 1100.

Each print setting item will now be described.

Original Size 1402 shows the paper size of original data to be printed, and gives the paper size with which the application 1100 performs printing.

Output Paper Size 1403 shows the paper size of output paper to be actually discharged. "Same as Original Size" is typically used. If another specific output paper size is selected, the printer driver 1200 or the printer 2000 performs enlarged or reduced printing depending on the ratio between the original size and the output paper size.

Number of Copies 1404 is used to make multiple copies of the same printed matter.

Page Layout 1405 shows the number of pages of the original printed on one sheet of physical paper. Typically, "1 on 1" is selected. If "N on 1" (where N is a predetermined integer value) is selected, N pages of the original are reduced and printed on one sheet of physical paper.

Scaling 1406 is used to specify any ratio in percentage and perform enlarged or reduced printing.

Color Mode 1407 is mainly used to print color data in black and white.

Stamp 1408 shows the function of printing any character string in addition to rending data specified by the application 1100. The stamp to be printed may be selected from preset stamps, such as "Classified" and "Confidential".

Favorites 1401 does not show an individual print setting item, but shows a function used to specify a set of print setting items. Favorites 1401 allows use of a predetermined set of favorite print setting items, and also allows creation and use of a new set of favorite print setting items.

Function Lock 1409 also does not show a print setting item, but shows the function of locking a setting value selected for any of the print setting items described above.

[OK] button 1410 is a button used to save the print settings and close the print settings UI 1400.

[Cancel] button 1411 is a button used to discard the print settings and close the print settings UI 1400.

[Apply] button 1412 is a button used to save the print settings without closing the print settings UI 1400.

Lock Settings UI

Figures 7, 8:
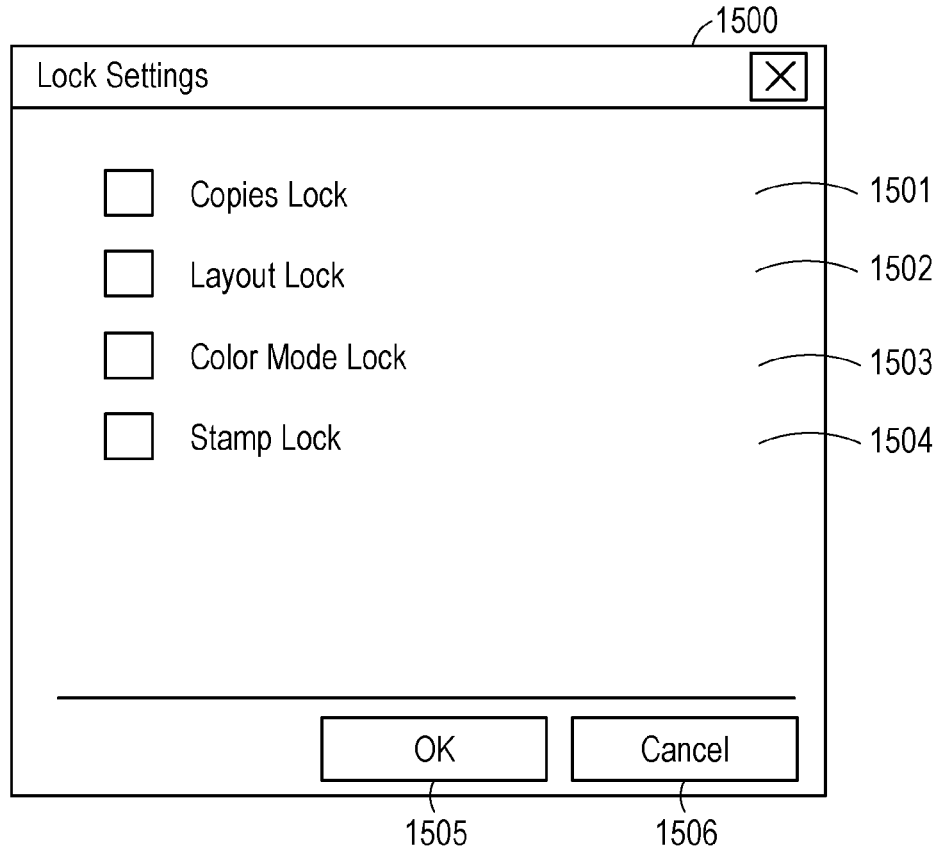
FIG. 7 illustrates a lock settings UI of a lock function according to the first embodiment.
FIG. 8 is a diagram showing print setting items corresponding to lock settings of the lock function according to the first embodiment.

FIG. 7 illustrates a lock settings UI 1500 displayed when Function Lock 1409 in FIG. 6 is selected and a [Lock Settings] button is pressed.

The lock settings UI 1500 is mainly used by an administrator user for the purpose of restricting the use of setting items available to general users. Therefore, only an administrator user with OS administrator authority can press the [Lock Settings] button in FIG. 6 and edit the lock settings UI 1500 displayed as illustrated in FIG. 7. Accordingly, when the [Lock Settings] button in FIG. 6 is pressed, a password entry screen (not shown) is displayed to prompt the administrator user to enter the password. When the password entered is authenticated, the lock settings UI 1500 illustrated in FIG. 7 appears and allows editing.

Copies Lock 1501 is selected to lock the use of Number of Copies 1404 in FIG. 6 and make the setting unchangeable.

Layout Lock 1502 is selected to lock the use of print setting items related to print layout, such as Output Paper Size 1403, Page Layout 1405, and Scaling 1406 in FIG. 6, and make these settings unchangeable.

Color Mode Lock 1503 is selected to lock the use of Color Mode 1407 in FIG. 6 and make the setting unchangeable.

Stamp Lock 1504 is selected to lock the use of Stamp 1408 and make the setting unchangeable.

[OK] button 1505 is a button used to save the lock information 1230 specified as described above, lock the print setting items specified, and close the lock settings UI 1500.

[Cancel] button 1506 is a button used to discard the operation in the lock settings UI 1500 currently displayed and close the lock settings UI 1500.

FIG. 8 shows print setting items corresponding to each of the lock settings.

When Copies Lock 1501 is selected in the lock settings UI 1500, the use of Number of Copies 1404 in the print settings UI 1400 is locked. When Layout Lock 1502 is selected in the lock settings UI 1500, the use of Output Paper Size 1403, Page Layout 1405, and Scaling 1406 in the print settings UI 1400 is locked. When Color Mode Lock 1503 is selected in the lock settings UI 1500, the use of Color Mode 1407 in the print settings UI 1400 is locked. When Stamp Lock 1504 is selected in the lock settings UI 1500, the use of Stamp 1408 in the print settings UI 1400 is locked.

(3) Startup Processing in UI Processing Unit

Processing performed by the UI processing unit 1220 at startup to display the print settings UI 1400 will now be described with reference to FIG. 9.

The processing to be described herein is all performed when software for the UI processing unit 1220 stored in the storage unit 1030 is loaded into the memory 1042 and executed by the CPU 1041.

In step S1001, at startup, the UI processing unit 1220 acquires, from the OS 1300, the user DEVMODE 1330 where user default print settings are managed.

Next, in step S1002, the UI processing unit 1220 reflects the acquired user DEVMODE 1330 in the print settings UI 1400.

Next, in step S1003, the UI processing unit 1220 acquires locked setting items from the lock information 1230.

Next, in step S1004, the UI processing unit 1220 checks whether there is any locked setting item. If there is no locked setting item (No in step S1004), the process proceeds to step S1009, where the UI processing unit 1220 displays the print settings UI 1400 and ends the processing.

On the other hand, if there is any locked setting item (Yes in step S1004), the process proceeds to step S1005.

In step S1005, the UI processing unit 1220 acquires locked setting item values from the global DEVMODE 1340. For example, if Layout Lock 1502 is selected in the lock settings UI 1500, the UI processing unit 1220 acquires the setting values of the output paper size, page layout, and scaling.

In step S1006, the UI processing unit 1220 reflects the locked setting item values acquired from the global DEVMODE 1340 in the print settings UI 1400. For example, assume that Layout Lock 1502 in the lock settings UI 1500 is selected and, in the user DEVMODE 1330 passed from the OS 1300, Number of Copies is "1", Output Paper Size is "A4", Page Layout is "1 on 1", and Manual Scaling is "Not Applicable". Also assume that in the global DEVMODE 1340, Number of Copies is "3", Output Paper Size is "Same as Original Size", Page Layout is "2 on 1", and Manual Scaling is "Not Applicable". In this case, Number of Copies "1", Output Paper Size "Same as Original Size", Page Layout "2 on 1", and Manual Scaling "Not Applicable" are displayed in the print settings UI 1400.

Next, in step S1007, the UI processing unit 1220 disables all UI entries for the locked setting item.

Then, in step S1008, the UI processing unit 1220 checks whether there is any other locked setting item. If there is any other locked setting item (Yes in step S1008), the process returns to step S1005 and the UI processing unit 1220 repeats the operation described above. If there is no locked setting item (No in step S1008), the process proceeds to step S1009, where the UI processing unit 1220 displays the print settings UI 1400 and ends the processing.

As described above, even when user default print settings are already set, if there is a setting item locked in the lock settings UI 1500, the corresponding default print setting common to all users is reflected in the print settings UI 1400.

(4) Processing in Rendering Processing Unit

Figure 9:
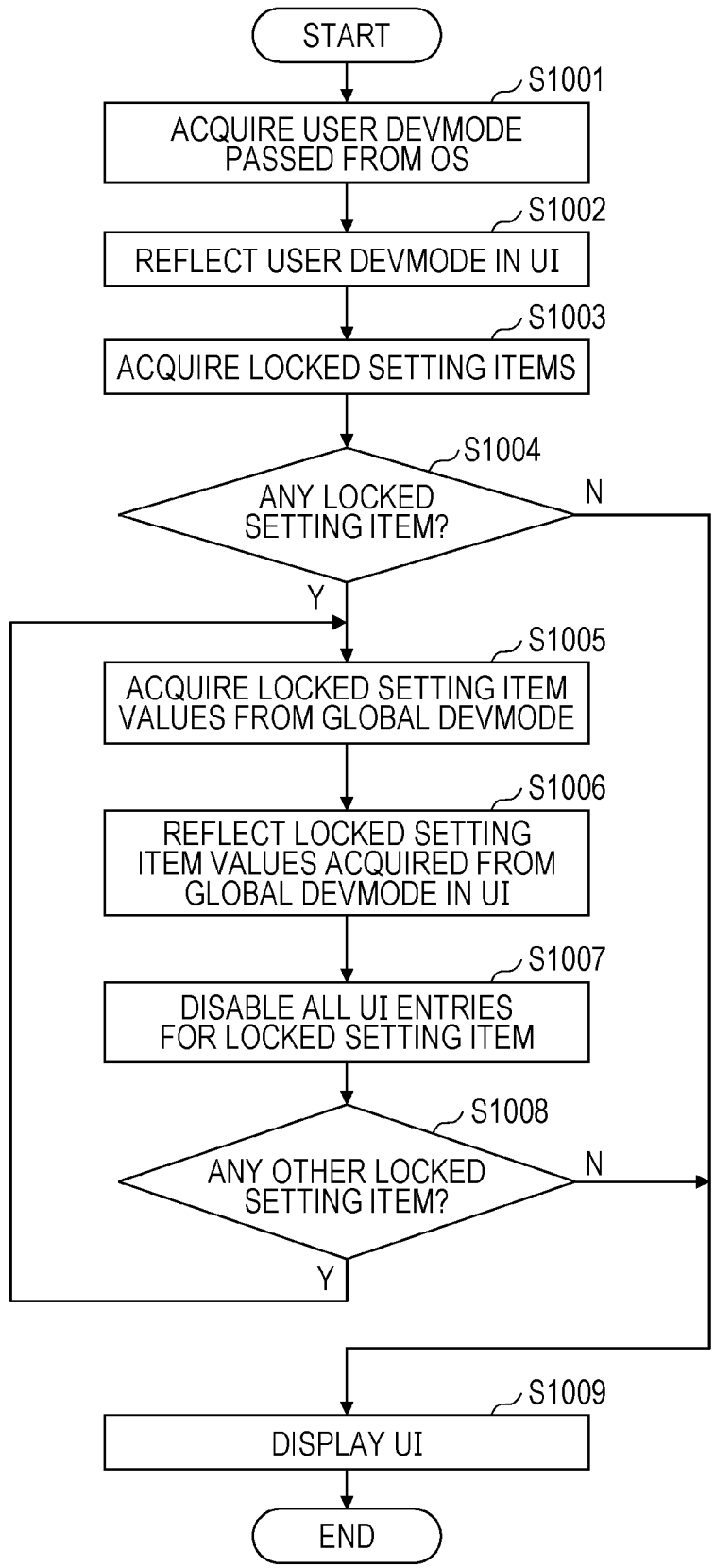
FIG. 9 is a flowchart of processing performed by a UI processing unit to start a print settings UI according to the first embodiment.

Even when, for example, the color mode is locked at "Black and White" in the flowchart of FIG. 9, "Color" can be specified as the color mode for actual printing in the application 1100. In such a case, the rendering processing unit 1210 performs the processing described below to set a setting value for a locked setting item.

Figure 10:
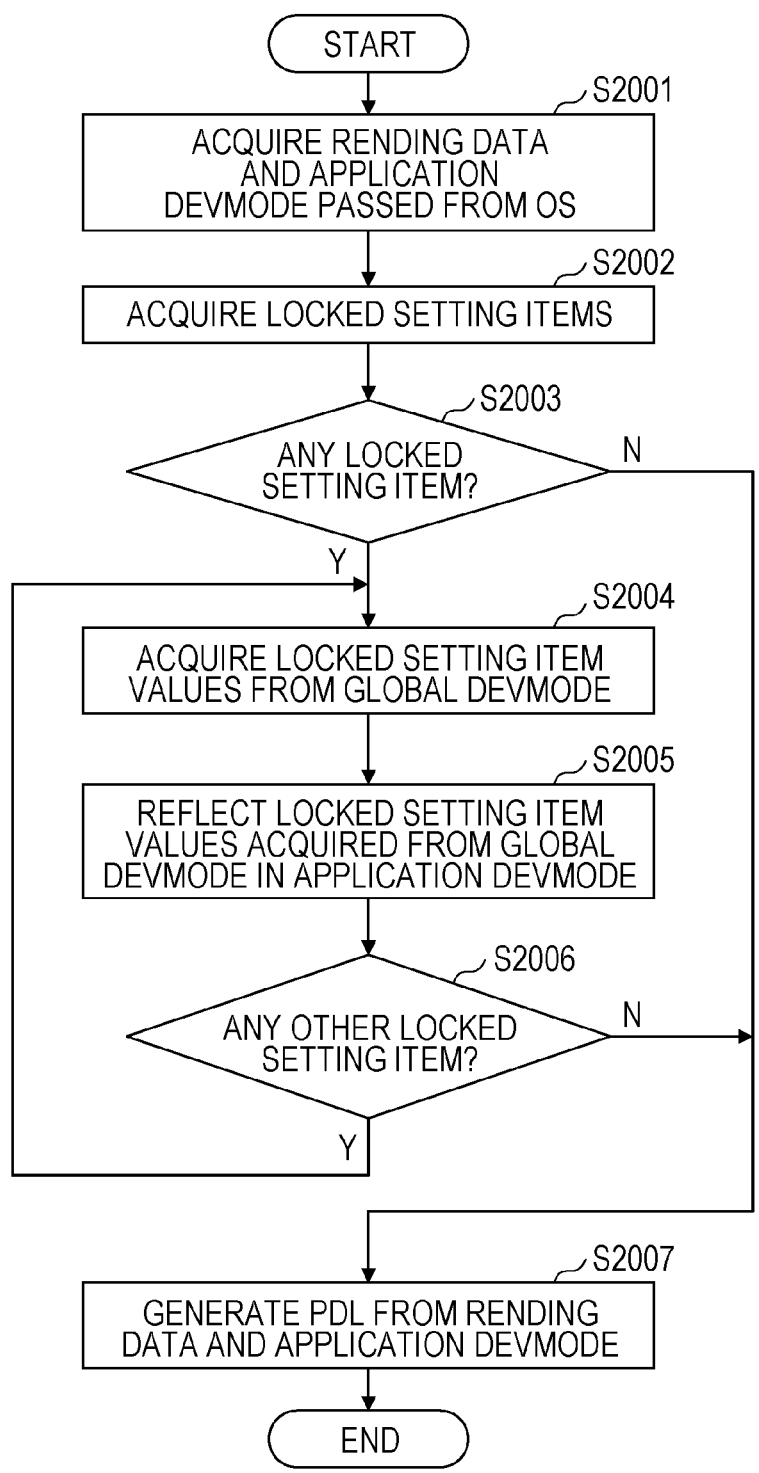
FIG. 10 is a flowchart of processing performed by a rendering processing unit according to the first embodiment.

Referring to FIG. 10, processing will be described in which on the basis of lock information, which is restrictive information for restricting changes, the rendering processing unit 1210 changes print settings to default print setting values common to all users and generates a PDL. The processing described herein is all performed when software for the rendering processing unit 1210 stored in the storage unit 1030 is loaded into the memory 1042 and executed by the CPU 1041.

First, in step S2001, the rendering processing unit 1210 acquires, from the OS 1300, print setting values set in the application 1100 (hereinafter referred to as "application DEVMODE") and rending data.

Next, in step S2002, the rendering processing unit 1210 acquires locked setting items from the lock information 1230 in the printer driver 1200.

Next, in step S2003, the rendering processing unit 1210 checks whether there is any locked setting item. If there is no locked setting item (No in step S2003), the process proceeds to step S2007, where the rendering processing unit 1210 generates an PDL on the basis of the application DEVMODE and rending data. On the other hand, if there is any locked setting item (Yes in step S2003), the process proceeds to step S2004, where the rendering processing unit 1210 acquires locked setting item values from the global DEVMODE 1340.

In step S2005, the rendering processing unit 1210 reflects the locked setting item values acquired from the global DEVMODE 1340 in the application DEVMODE. For example, assume that Color Mode Lock 1503 is selected in the lock settings UI 1500 to lock the color mode at "Black and White", whereas "Color" is specified as the color mode in the application 1100. In this case, the color mode of the application DEVMODE passed from the OS 1300 is "Color", and the color mode of the global DEVMODE 1340 is "Black and White". The color mode of the print setting value (DEVMODE) on the basis of which the rendering processing unit 1210 generates a PDL is "Black and White", which reflects the global DEVMODE.

Next, in step S2006, the rendering processing unit 1210 checks whether there is any other locked setting item.

If there is any other locked setting item (Yes in step S2006), the process returns to step S2004 and the rendering processing unit 1210 repeats the operation described above. If there is no locked setting item (No in step S2006), the process proceeds to step S2007, where the rendering processing unit 1210 generates a PDL on the basis of the print setting value (DEVMODE) and rending data.

As described above, for the print setting item locked in the lock settings UI 1500, the administrator user can lock the setting value specified in the print settings UI 1400.

Second Embodiment

In the first embodiment described above, only administrator users with administrator authority can set the lock information 1230, which is restrictive information restricting changes to setting values, and print setting values (global DEVMODE) common to all users. In a second embodiment, some general users are given administrator authority to set lock information specific to each user (hereinafter referred to as user-specific lock information), so that printing can be performed on the basis of the user-specific lock information.

Software Configuration of Computer

Figure 11:
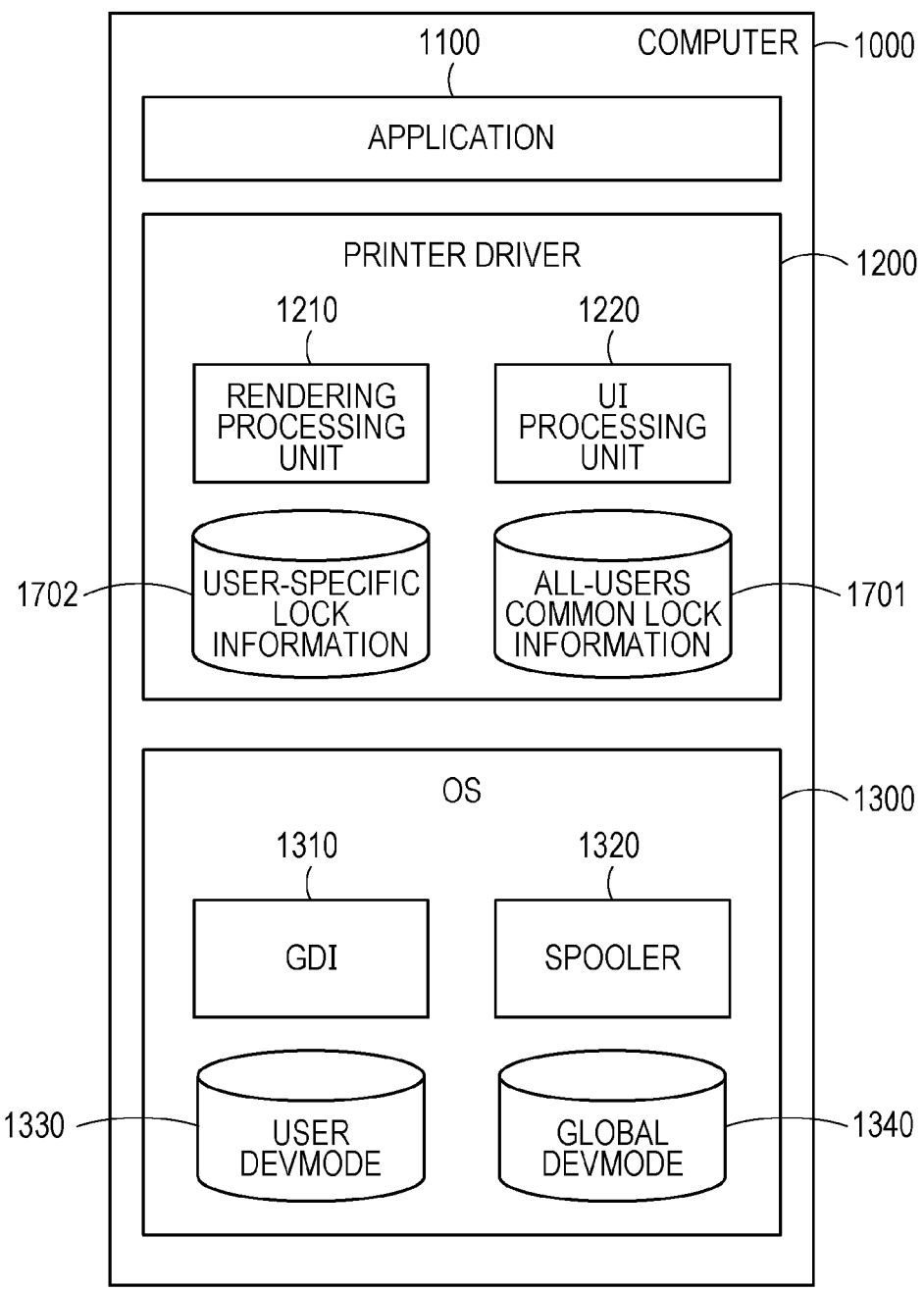
FIG. 11 illustrates a software configuration related to print processing in the computer according to a second embodiment.

FIG. 11 is a block diagram illustrating a software configuration related to print processing in the computer 1000 according to the second embodiment. The following description deals with differences with the software configuration of the first embodiment illustrated in FIG. 4. The description of common parts will be omitted.

Lock information is divided into all-users common lock information 1701 and user-specific lock information 1702, which are stored in two different areas. The all-users common lock information 1701 is print setting lock information common to all users. Only users with administrator authority have access to the all-users common lock information 1701. The user-specific lock information 1702 is print setting lock information specific to individual users. Authorized general users have access only to the user-specific lock information 1702 of their own.

Lock Settings UI

Figure 12:
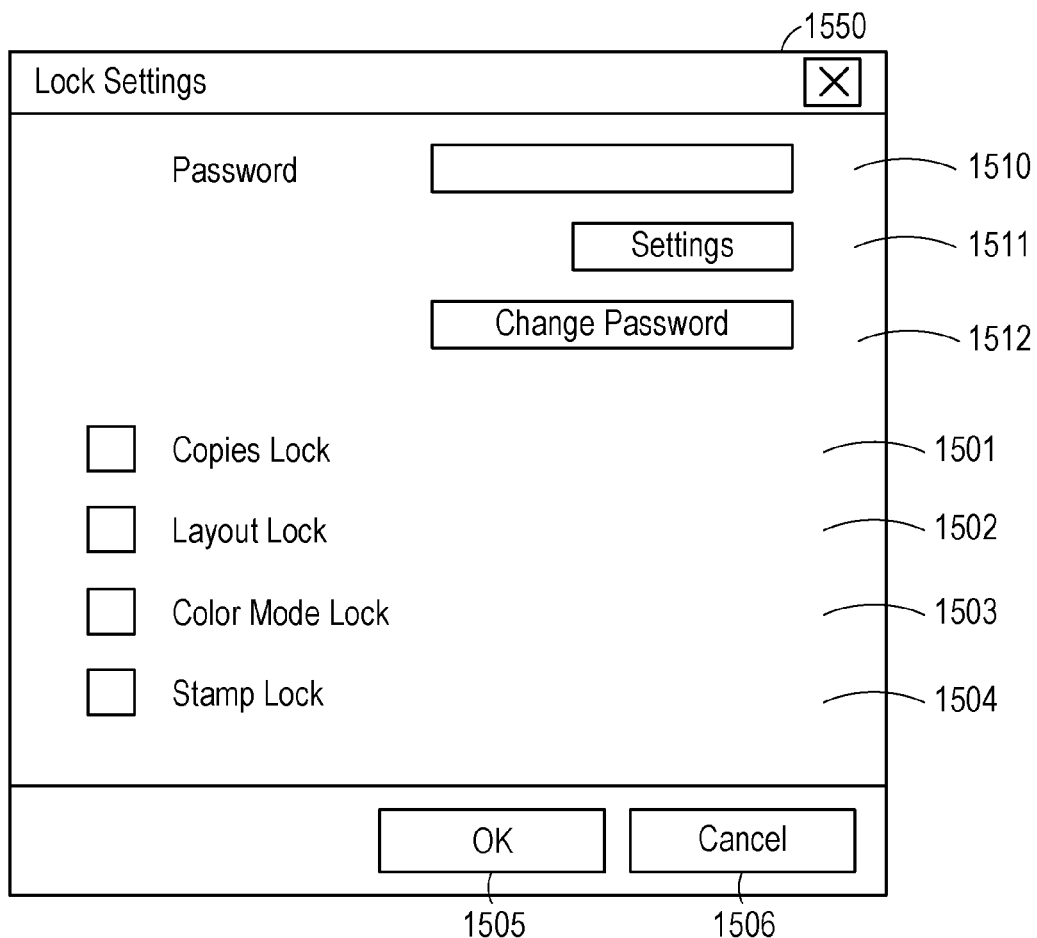
FIG. 12 illustrates a lock settings UI of a lock function according to the second embodiment.

FIG. 12 illustrates a lock settings UI 1550 displayed when Function Lock 1409 in FIG. 6 is selected and the [Lock Settings] button is pressed.

The lock settings UI 1550 is mainly used by an administrator user for the purpose of restricting the use of setting items available to general users. The difference from the lock settings UI 1500 (see FIG. 7) of the first embodiment is that the lock settings UI 1550 provides a password entry field. In the second embodiment, the lock settings UI 1550 allows general users (who are not administrator users with administrator authority) to set lock setting items on the screen. A lock setting item set by a general user is stored as the user-specific lock information 1702.

A password string preset by an administrator user is entered in the field of Password 1510, and a [Settings] button 1511 is pressed. Upon authentication of the password, the checkboxes for locking the functions (1501 to 1504) and a [Change Password] button 1512 are enabled.

The [Change Password] button 1512 can be used only by administrator users. Pressing the [Change Password] button 1512 displays a setting UI 1600 (see FIG. 13) for changing a password.

(UI for Changing Password)

Figure 13:
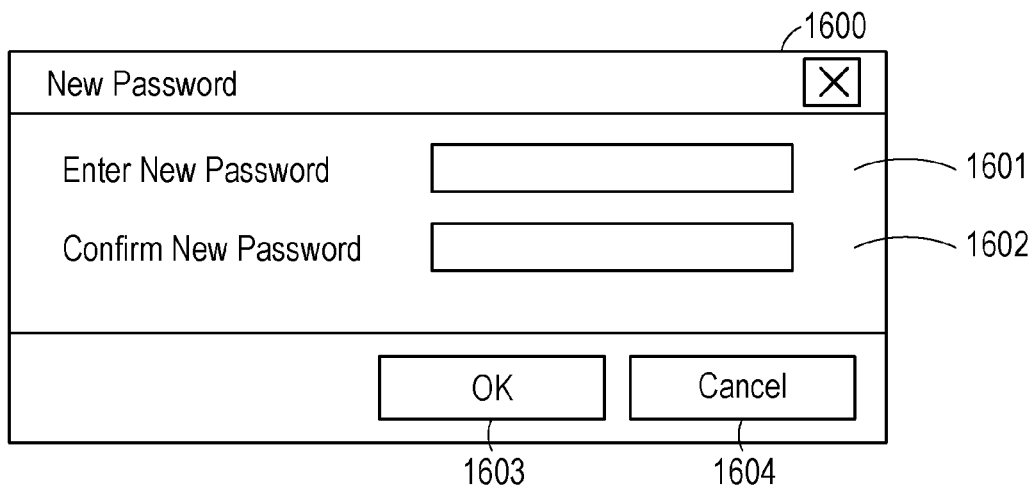
FIG. 13 illustrates a setting UI for changing a password according to the second embodiment.

In the setting UI 1600 illustrated in FIG. 13, an administrator user enters a new password in two control fields, Enter New Password 1601 and Confirm New Password 1602, and presses an [OK] button 1603. Then, a password used in lock setting is obfuscated and stored, for each printer object, in the all-users common area common to all users. A

[Cancel] button 1604 is a button used to discard the operation in the setting UI 1600 currently displayed and close the setting UI 1600.

FIG. 12 and FIG. 13 illustrate an example where only one password is used. The password used in the present embodiment is a password also used by general users. It is possible that the password is used by many general users. To ensure security, therefore, administrator users may use a password different from that for general users. In the present embodiment, a single password common to administrator and general users is used.

Figure 14:
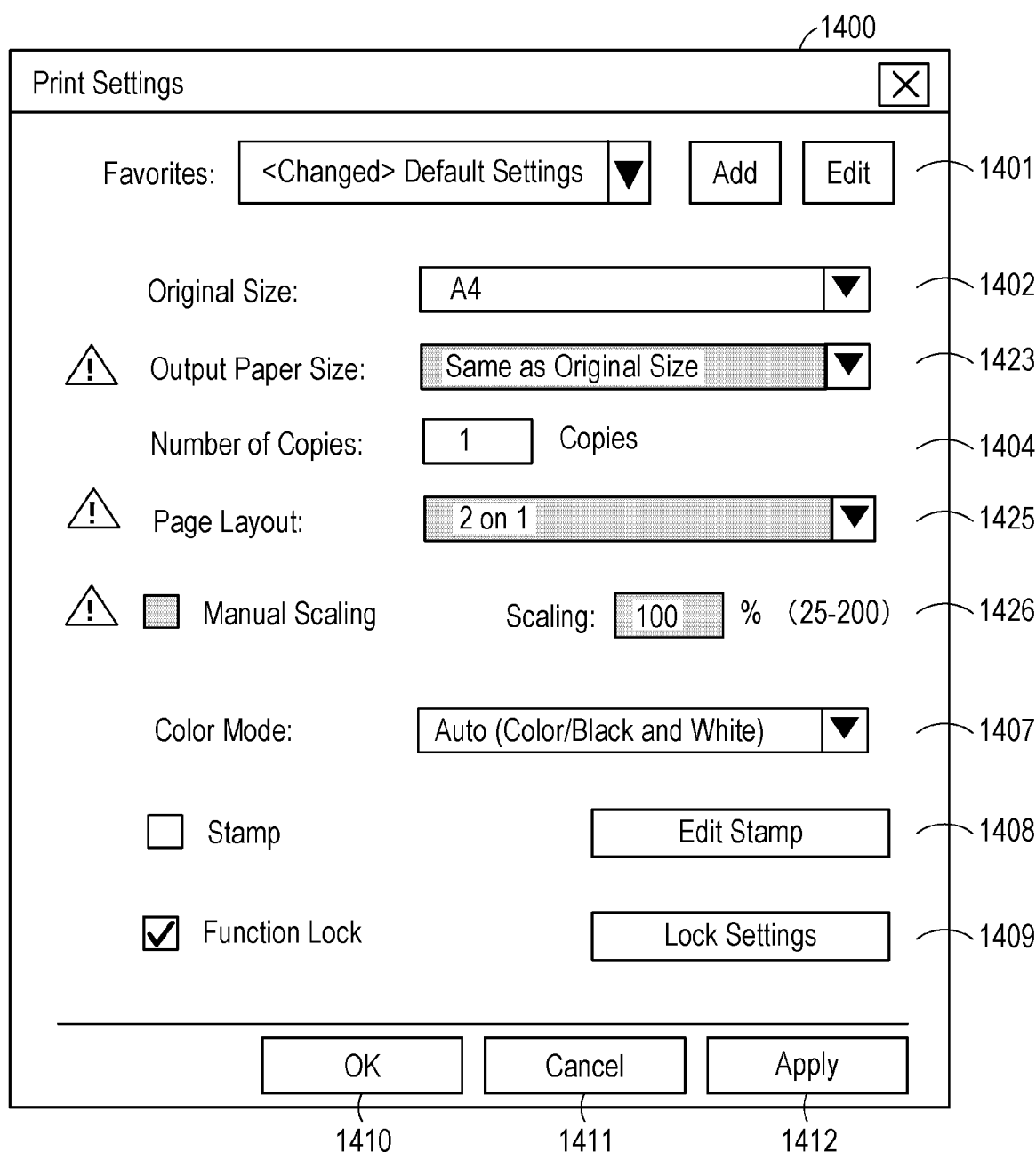
FIG. 14 illustrates a print settings UI of the printer driver according to the second embodiment.

FIG. 14 illustrates how the print settings UI 1400 is displayed when Layout Lock 1502 (see FIG. 12) is selected. Output Paper Size 1423, Page Layout 1425, and Manual Scaling 1426, which are related to layout including enlargement and reduction, are each marked with a marker before (or to the left of) the control field. Each control field is disabled (or grayed out), so that the corresponding value is locked and unchangeable.

(5) Processing for Storing Lock Information

Figure 15:
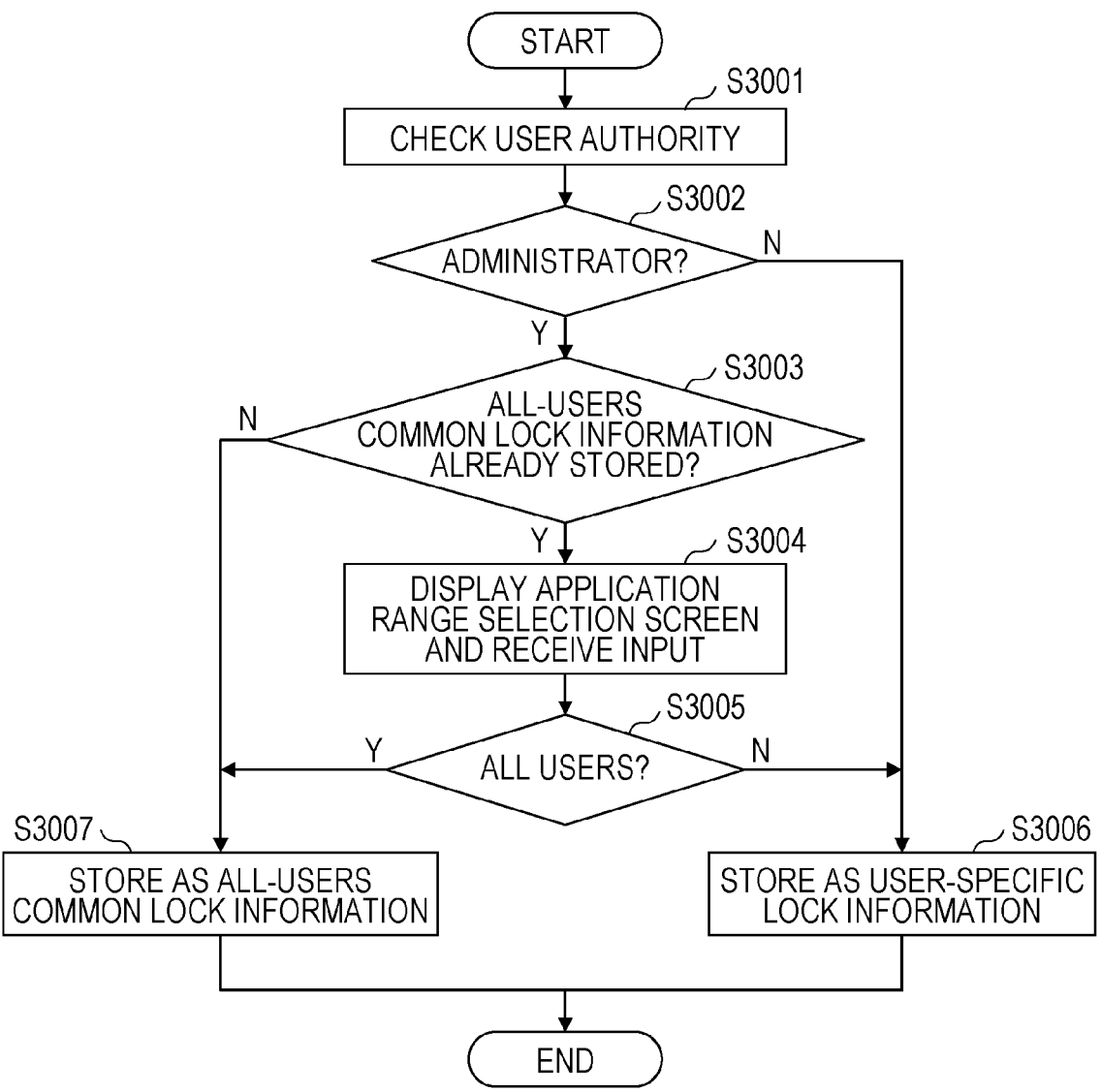
FIG. 15 is a flowchart of processing performed by the UI processing unit to store lock information according to the second embodiment.

Referring to FIG. 15, processing for storing lock information is described. This processing is performed when a user presses the [OK] button 1505 in the lock settings UI 1550 (see FIG. 12) displayed by the UI processing unit 1220. The processing described herein is all performed when software for the UI processing unit 1220 stored in the storage unit 1030 is loaded into the memory 1042 and executed by the CPU 1041.

In step S3001, when the [OK] button 1505 in the lock settings UI 1550 is pressed, the UI processing unit 1220 checks the authority of the user carrying out the operation.

In step S3002, the UI processing unit 1220 determines whether the user who has pressed the [OK] button 1505 has administrator authority.

If the user who has pressed the [OK] button 1505 has general authority (No in step S3002), the process proceeds to step S3006.

In step S3006, the UI processing unit 1220 generates information reflecting the setting state of Copies Lock 1501, Layout Lock 1502, Color Mode Lock 1503, and Stamp Lock 1504 in the lock settings UI 1550 (see FIG. 12). The UI processing unit 1220 then stores the generated information as the user-specific lock information 1702 in the user dedicated area for the target printer object, and ends the processing.

The user dedicated area will now be described. The user dedicated area refers to an area in the storage unit 1030 from and to which only the appropriate user can freely read and write data under the OS 1300. In the OS 1300 of Microsoft (Windows), for example, the user dedicated area is an area subordinate to the registry HKEY_CURRENT_USER. Settings for each user are stored in the user dedicated area. User default print settings (user DEVMODE), described below, are also stored in the user dedicated area.

Figures 16, 17:
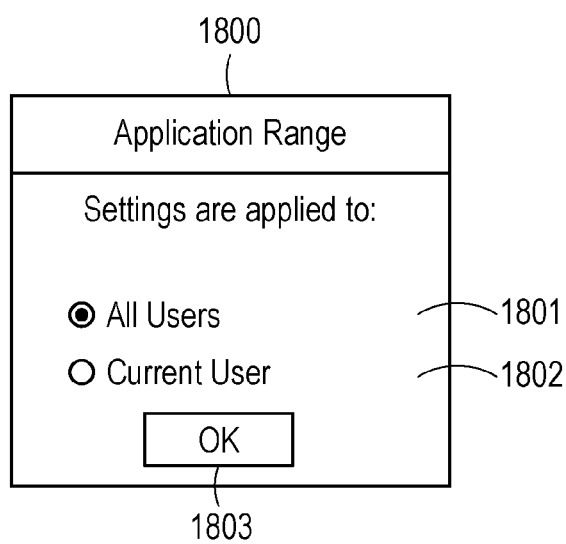
FIG. 16 illustrates a data structure of lock function settings according to the second embodiment.
FIG. 17 illustrates a screen for selecting a range of application of lock function settings according to the second embodiment.

FIG. 16 illustrates a data structure of the all-users common lock information 1701 and the user-specific lock information 1702. Specifically, FIG. 16 shows whether checkboxes (see FIG. 12) for Copies Lock 1501, Layout Lock 1502, Color Mode Lock 1503, and Stamp Lock 1504 in the lock settings UI 1550 are selected. Referring to FIG. 16, the value "0" indicates that the checkbox is "OFF" (i.e., the corresponding setting item is not locked by the user), and the value "1" indicates that the checkbox is "ON" (i.e., the corresponding setting item locked by the user). FIG. 16 shows, as an example, that in the lock settings UI 1550 (see FIG. 12), Copies Lock 1501 is OFF, Layout Lock 1502 is ON, Color Mode Lock 1503 is ON, and Stamp Lock 1504 is OFF.

Referring back to step S3002 in FIG. 15, assume that the UI processing unit 1220 determines that the user with administrator authority has pressed the [OK] button 1505 (see FIG. 12) (Yes in step S3002).

If the user is an administrator user, it is necessary to clarify the authority (administrator or general) with which the user selects the lock setting item.

Therefore, in step S3003, the UI processing unit 1220 checks whether the all-users common lock information 1701 exists.

If the all-users common lock information 1701 does not exist (No in step S3003), the process proceeds to step S3007.

The all-users common lock information 1701 is stored first in step S3007. The operation in step S3007 is described in detail later on below.

If the all-users common lock information 1701 already exists (Yes in step S3003), the process proceeds to step S3004.

In step S3004, the UI processing unit 1220 displays an application range selection screen 1800 shown in FIG. 17. If an administrator user generates or changes the all-users common lock information 1701 as an administrator, the administrator user selects All Users 1801. If the administrator user generates or changes the user-specific lock information 1702 as a general user, the administrator user selects Current User 1802 and presses an [OK] button 1803.

In step S3005, the UI processing unit 1220 determines whether All Users 1801 has been selected on the application range selection screen 1800.

If the UI processing unit 1220 determines that the administrator user has selected Current User 1802 on the application range selection screen 1800 (No in step S3005), the process proceeds to step S3006, as in the case where the user carrying out the operation is a general user (No in step S3002).

In step S3006, the UI processing unit 1220 stores a lock setting item set in the lock settings UI 1500 as the user-specific lock information 1702 for a target printer object.

If the UI processing unit 1220 determines that the administrator user has selected All Users 1801 on the application range selection screen 1800 (Yes in step S3005), the process proceeds to step S3007.

In step S3007, the UI processing unit 1220 stores a lock setting item set in the lock settings UI 1550, in the all-users common area, as the all-users common lock information 1701 for the target printer object.

The all-users common area will now be escribed. The all-users common area refers to an area in the storage unit 1030 from which all users can read data and to which users with administrator authority can write data under the OS 1300. In the case of a printer object for the OS 1300 of Microsoft (Windows), for example, the all-users common area is an area subordinate to the registry HKEY_LOCAL_MACHINE\SYSTEM\CurrentControlSet\Control\Print\Printers\<printer name>\PrinterDriverData. Note that <printer name> indicates the name of the printer object. Print settings common to all users using this printer object are stored in the all-users common area. Users with administrator authority are allowed to write data to the printer object. Global print settings, described below, are also stored in the all-users common area.

As described above, if a user sets a lock setting item in the lock settings UI 1550 as an administrator user, the set lock setting item is stored as the all-users common lock information 1701. If a user sets a lock setting item in the lock settings UI 1550 as a general user, the set lock setting item is stored as the user-specific lock information 1702.

(6) Processing in Rendering Processing Unit for Printing

Figure 18:
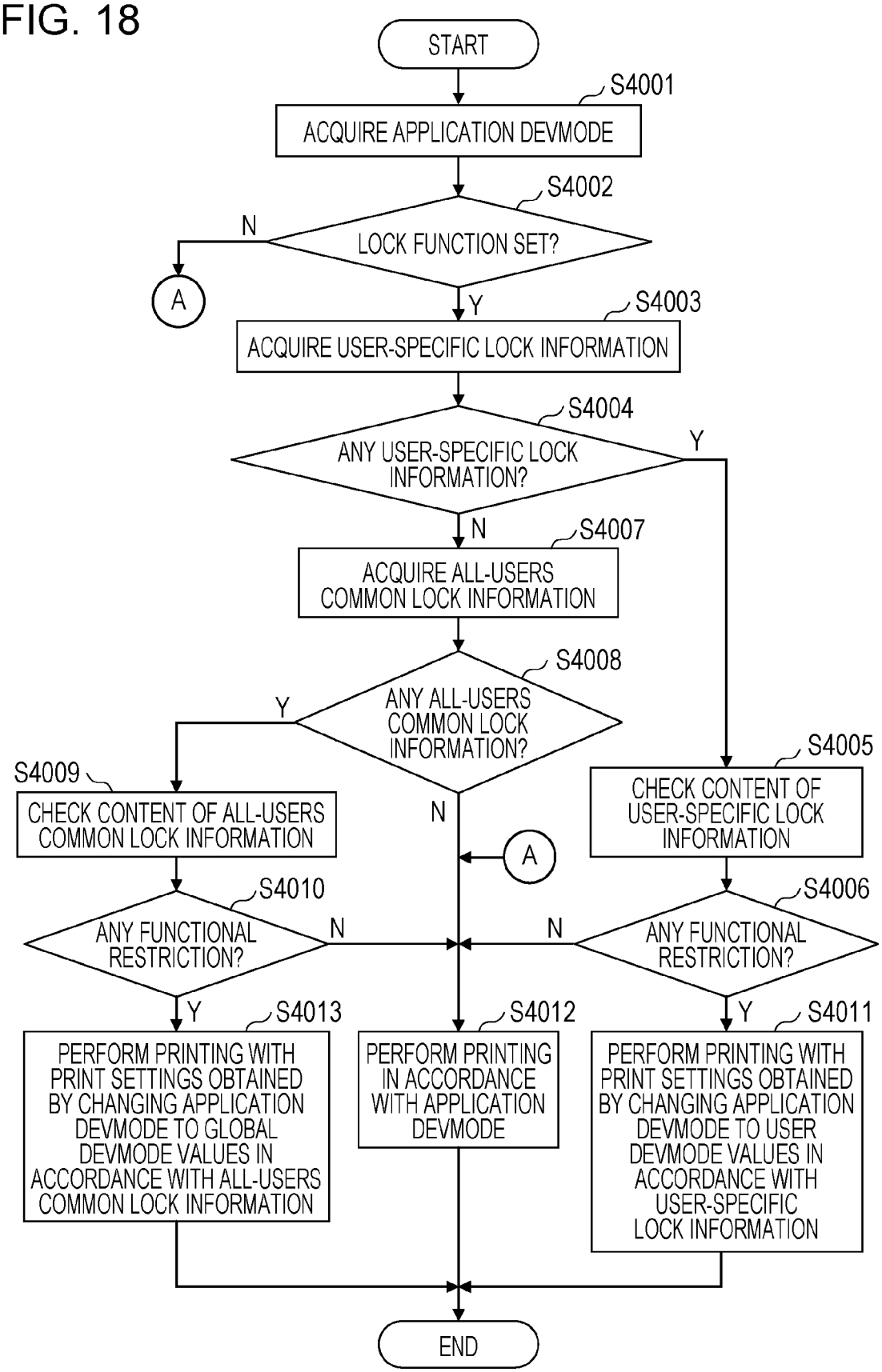
FIG. 18 is a flowchart of processing performed by the rendering processing unit according to the second embodiment.

Referring to FIG. 18, processing will be described in which the rendering processing unit 1210 determines print settings for printing. The processing described herein is all performed when software for the rendering processing unit 1210 stored in the storage unit 1030 is loaded into the memory 1042 and executed by the CPU 1041.

First, in step S4001, the rendering processing unit 1210 acquires, through the GDI 1310, print setting values (application DEVMODE) set in the application 1100.

Next, in step S4002, the rendering processing unit 1210 checks whether the lock function is properly set. Specifically, for example, the rendering processing unit 1210 checks if a password, lock information, and a value indicating whether the lock function is enabled, are properly stored in the all-users common area for the target printer object.

If the lock function is not properly set (No in step S4002), the process proceeds to step S4012, where the rendering processing unit 1210 performs print processing in accordance with the application print settings, without using the lock function.

If the lock function is properly set (Yes in step S4002), the process proceeds to step S4003.

In step S4003, the rendering processing unit 1210 acquires the user-specific lock information 1702 for the target printer object.

In step S4004, the rendering processing unit 1210 determines whether the user-specific lock information 1702 exists.

If the user-specific lock information 1702 exists (Yes in step S4004), the process proceeds to step S4005.

In step S4005, the rendering processing unit 1210 checks the content of the user-specific lock information 1702 and subsequently determines, in step S4006, whether the use of any printing function is restricted.

The rendering processing unit 1210 checks the lock state of each setting item (see FIG. 16) in the user-specific lock information 1702. If any lock function is ON, the rendering processing unit 1210 determines that there is a functional restriction (Yes in step S4006) and the process proceeds to step S4011.

In step S4011, the rendering processing unit 1210 rewrites the application DEVMODE received in step S4001, in accordance with the user-specific lock information 1702. First, the rendering processing unit 1210 acquires user default print settings (user DEVMODE) stored in the user dedicated area. Next, for a setting item selected in the lock function settings 1700 (see FIG. 16), the rendering processing unit 1210 overwrites the corresponding setting value in the application DEVMODE with a setting value in the user DEVMODE.

In step S4011, for example, if color mode is selected as a setting item to be locked in the user-specific lock information 1702, the rendering processing unit 1210 overwrites the setting value for color mode in the application DEVMODE with a setting value for color mode in the user default print settings (user DEVMODE). Specifically, if the setting value for color mode in the user DEVMODE is "Black and White", the rendering processing unit 1210 overwrites the setting value for color mode in the application DEVMODE with "Black and White". For all setting items selected to be locked in the user-specific lock information 1702, the rendering processing unit 1210 rewrites each setting value in the application DEVMODE with the corresponding setting value in the user DEVMODE to determine print settings (DEVMODE) used in printing.

If there is no functional restriction (No in step S4006), the process proceeds to step S4012, where the rendering processing unit 1210 performs print processing in accordance with the application DEVMODE.

If the user-specific lock information 1702 does not exist (No in step S4004), the process proceeds to step S4007.

In step S4007, the rendering processing unit 1210 acquires the all-users common lock information 1701 for the target printer object.

In step S4008, the rendering processing unit 1210 determines whether the all-users common lock information 1701 exists.

If the all-users common lock information 1701 exists (Yes in step S4008), the process proceeds to step S4009.

In step S4009, the rendering processing unit 1210 checks the content of the all-users common lock information 1701 and subsequently determines, in step S4010, whether the use of any printing function is restricted. The rendering processing unit 1210 checks the lock state of each setting item (see FIG. 16) in the all-users common lock information 1701. If any lock function is ON, the rendering processing unit 1210 determines that there is a functional restriction (Yes in step S4010) and the process proceeds to step S4013.

In step S4013, the rendering processing unit 1210 rewrites the application DEVMODE received in step S4001, in accordance with the all-users common lock information 1701. The rendering processing unit 1210 first acquires the global DEVMODE stored in the all-users common area. Then, for a setting item specified in the lock function settings 1700 (see FIG. 16), the rendering processing unit 1210 overwrites the corresponding setting value in the application DEVMODE with a setting value in the global DEVMODE.

In step S4013, for example, if layout is selected as a setting item to be locked in the all-users common lock information 1701, the rendering processing unit 1210 overwrites the layout-related setting values in the application DEVMODE with the corresponding setting values for page layout, output paper size, and scaling in the global DEVMODE. Specifically, for layout in the global DEVMODE, if Page Layout is "2 on 1", Output Paper Size is "Same as Original Size", and Manual Scaling is "Not Applicable", the rendering processing unit 1210 overwrites the setting values for Page Layout, Output Paper Size, and Manual Scaling in the application DEVMODE with "2 on 1", "Same as Original Size", and "Not Applicable", respectively. For all setting items selected to be locked in the all-users common lock information 1701, the rendering processing unit 1210 rewrites each setting value in the application DEVMODE with the corresponding setting value in the global DEVMODE to determine print settings (DEVMODE) used in printing.

If there is no functional restriction (No in step S4010) and the all-users common lock information 1701 does not exist (No in step S4008), the process proceeds to step S4012, where the rendering processing unit 1210 performs print processing in accordance with the application DEVMODE.

The rendering processing unit 1210 thus determines print settings used in printing.

The processing for determining print settings ends here.

Last, the operation will be described. By carrying out embodiments of the present disclosure as described above, the lock function set by the administrator can be changed by individual users using passwords. If the administrator does not want to apply the lock function to a particular user, the administrator discloses the administrator password to the user. In the lock settings UI 1550 (see FIG. 12), the user enters the disclosed password and unlocks the locked function, so that the lock function set by the administrator is not applied to the user.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-175788, filed Oct. 20, 2020, which is hereby incorporated by reference herein in its entirety.

What is claimed is:

1. An information processing apparatus comprising:
a controller configured to:
store a setting value of a first print setting item and a setting value of a second print setting item as common setting values, wherein the common setting values are set by an administrator of an operating system of the information processing apparatus;
store another setting value of the first print setting item and another setting value of the second print setting item as default setting values corresponding to a user different from the administrator;
enable a function for restricting a setting value of the first print setting item to the setting value of the first print setting item stored as the common setting value in a situation that the default setting values are stored and the administrator is logged into the operating system of the information processing apparatus; and
cause a display to display the print setting value of the first print setting item stored as the common setting value and said another setting value of the second print setting item stored as the default setting value in a situation that the function is enabled and the user is logged into the operating system of the information processing apparatus,
wherein the setting value of the first print setting item is not able to be changed by the user and said another setting value of the second print setting item is able to be changed by the user in the situation that the function is enabled and the user is logged into the operating system of the information processing apparatus.

2. The information processing apparatus according to claim 1, wherein the administrator is a user having administrator authority.

3. The information processing apparatus according to claim 1, wherein the first print setting item is an item related to one of a color mode, a print layout, a number of copies, and a stamp function.

4. The information processing apparatus according to claim 1, wherein the controller is further configured to:
cause the display to display an object related to the function, wherein the object indicates that the function is enabled.

5. The information processing apparatus according to claim 1, wherein the controller is further configured to:
generate print data based on the setting value of the first print setting item stored as the common setting value in a case that the function is enabled.

6. The information processing apparatus according to claim 5, wherein the controller is further configured to:
transmit the generated print data to a printing apparatus.

7. A control method for controlling an information processing apparatus, the control method comprising:
storing a setting value of a first print setting item and a setting value of a second print setting item as common setting values, wherein the common setting values are set by an administrator of an operating system of the information processing apparatus;
storing another setting value of the first print setting item and another setting value of the second print setting item as default setting values corresponding to a user different from the administrator;
enabling a function for restricting a setting value of the first print setting item to the setting value of the first print setting item stored as the common setting value in a situation that the default setting values are stored and the administrator is logged into the operating system of the information processing apparatus; and
causing a display to display the print setting value of the first print setting item stored as the common setting value and said another setting value of the second print setting item stored as the default setting value in a situation that the function is enabled and the user is logged into the operating system of the information processing apparatus,
wherein the setting value of the first print setting item is not able to be changed by the user and said another setting value of the second print setting item is able to be changed by the user in the situation that the function is enabled and the user is logged into the operating system of the information processing apparatus.

8. The control method according to claim 7, wherein the administrator is a user having administrator authority.

9. The control method according to claim 7, wherein the first print setting item is an item related to one of a color mode, a print layout, a number of copies, and a stamp function.

10. The control method according to claim 7, further comprising:
causing the display to display an object related to the function, wherein the object indicates that the function is enabled.

11. The control method according to claim 7, further comprising:
generating print data based on the setting value of the first print setting item stored as the common setting value in a case that the function is enabled; and
transmitting the generated print data to a printing apparatus.

12. A non-transitory computer-readable storage medium storing a program configured to be executed by one or more processors of an information processing apparatus, the program including instructions for causing the information processing apparatus to:
store a setting value of a first print setting item and a setting value of a second print setting item as common setting values, wherein the common setting values are set by an administrator of an operating system of the information processing apparatus;
store another setting value of the first print setting item and another setting value of the second print setting item as default setting values corresponding to a user different from the administrator;
enable a function for restricting a setting value of the first print setting item to the setting value of the first print setting item stored as the common setting value in a situation that the default setting values are stored and the administrator is logged into the operating system of the information processing apparatus; and
cause a display to display the print setting value of the first print setting item stored as the common setting value and said another setting value of the second print setting item stored as the default setting value in a situation that the function is enabled and the user is logged into the operating system of the information processing apparatus,
wherein the setting value of the first print setting item is not able to be changed by the user and said another setting value of the second print setting item is able to be changed by the user in the situation that the function is enabled and the user is logged into the operating system of the information processing apparatus.

* * * * *